Nov. 27, 1928.

C. LAPOLLA 1,693,393

PLANT SUPPORT

Filed Oct. 5, 1927

INVENTOR.
C. Lapolla
BY
ATTORNEY

Patented Nov. 27, 1928.

1,693,393

UNITED STATES PATENT OFFICE.

CARLO LAPOLLA, OF NEW CANAAN, CONNECTICUT.

PLANT SUPPORT.

Application filed October 5, 1927. Serial No. 224,105.

The present invention relates to improvements in devices for supporting plants, flowers and the like, and more particularly to that type which comprises a vertical rod or stake, combined with one or more loops for engaging a single plant or plants in clusters.

It has been proposed heretofore to provide plant supports of this type which are formed entirely of wire. In these devices, however, the stake and the plant-engaging loops are made of separate pieces, so that special means must be provided for maintaining the loops in position upon the stake. Furthermore, the loops are either permanently closed or difficult to open and close, and therefore cannot be conveniently engaged with or disengaged from the plants.

The main object of the present invention is to construct the support, that is to say the stake and plant-engaging loop, of one integral piece and to form the plant-engaging loop of two complementary sections which may be readily engaged with and disengaged from the plant.

Another object of the invention is to provide the plant-engaging loop sections with resilient bends, forming part of the stake, which maintain the loop sections in closing, plant-engaging positions and which, when moved toward one another, cause the plant-engaging loop sections to recede, thereby permitting of convenient insertion or withdrawal of the plant stem from the loop.

A further object of the invention is to provide a simple locking means for preventing accidental opening of the loop sections of the device.

Still a further object of the invention is to so construct the stake of the plant support that its height may be varied according to the requirements.

With these and other objects in view, which will more fully appear as the nature of the invention is better understood, the same consists in the combination, arrangement and construction of parts hereinafter described, pointed out in the appended claim and illustrated in the accompanying drawings, it being understood that many changes may be made in the size and proportion of the several parts and details of construction within the scope of the appended claim, without departing from the spirit or sacrificing any of the advantages of the invention.

One of the many possible embodiments of the invention is illustrated in the accompanying drawings, in which:—

Figure 1:
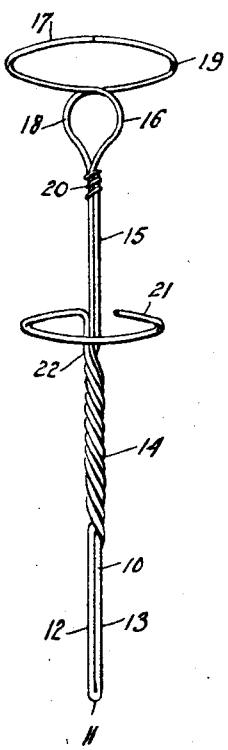
Figure 2:
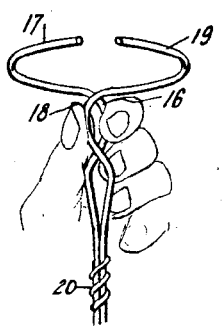
Figure 3:
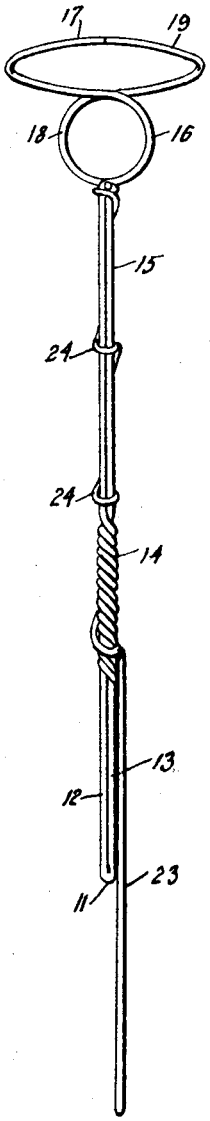

Figure 1 is a perspective view of a plant support constructed in accordance with the present invention, the plant-engaging loop sections thereof being in their plant-encircling positions; Fig. 2 is a similar view of the upper portion of the said device, showing the manner in which the loop sections thereof are caused to recede for the purpose above stated; and Fig. 3 is a view similar to the one shown in Fig. 1 of a plant support provided with an extensible stake.

Referring now first to Figs. 1 and 2 of the drawings, the numeral 10 indicates a strand of wire, which is bent back upon itself at its middle portion 11, thereby forming two parallel members 12 and 13, preferably, in contact with one another. These members are then twisted together, as shown at 14, mainly for the purpose of strengthening the device, and run thence again in parallel relation to one another, as shown at 15. The member 12 is then bent outwardly, as indicated at 16, and then continued in the form of a semi-circular loop section 17. The member 13 is bent above the section 15 outwardly, as indicated at 18, in a direction opposite to the outwardly bent portion 16 of the member 12, it crossing the said portion 16 and being then bent into the shape of a semi-circular loop section 19. The free ends of the loop sections 17 and 19 meet, as clearly shown in Fig. 1 of the drawings. The loop sections are disposed in a plane at right angles to the members 12 and 13 of the device. The bends 16 and 18 are somewhat resilient and have a tendency to keep the loop sections in closed positions shown in Fig. 1 of the drawings, that is to say their free ends in engagement with each other. That portion of the device which is disposed below the loop sections constitutes a stake, adapted to be driven into the ground near the plant. The resilient oppositely outwardly bent portions 16 and 18 are part of the stake and their purpose is twofold, to wit: They, first, serve to hold the loop sections in closing positions, and, second, they constitute means to be engaged by the hand of the user, as shown in Fig. 2 of the drawings, for causing the loop sections to recede from one another when the said two oppositely bent portions of the stake are forced toward one another.

If necessary, locking means may be provided for preventing accidental disengagement of the free ends of the loop sections 17 and 19. This locking means may be of any suitable form. In the case illustrated it consists of a wire coil 20, wound about the portion 15 of the stake. When this wire coil is moved into engagement with the oppositely bent portions 16 and 18 of the stake, it prevents the loop sections 17 and 19 from moving to open positions. When it is intended to open the loop sections, the said wire coil must be shifted a substantial distance downwards on the stake, as shown in Fig. 2 of the drawings, after which the oppositely bent portions 16 and 18 of the stake may be forced manually toward one another so as to bring the loop sections to open positions.

One or more supplemental plant-engaging loops may be mounted upon the stake. In Fig. 1 of the drawings one of these supplemental loops is shown, it consisting of an open loop 21, extending in parallel relation to the loop above described and being provided with a stake-engaging arm 22, which is bent substantially at right angles thereto. The major portion of this stake-engaging arm is twisted, it being wound around the twisted portion 14 of the stake.

In use, the lower portion of the stake is inserted in the soil near the growing plant, the stalk of which is first engaged with the open loop 21 and thereafter with the main loop above referred to. In engaging the stalk with the main loop, first the locking device 20 is shifted downwards on the stake, the free ends of the loop sections 17 and 19 are then disengaged, they being brought into the positions shown in Fig. 2 of the drawings, permitting of insertion of the stalk thereinto. When then the oppositely bent portions 16 and 18 of the stake are permitted to spring back to their normal positions, shown in Fig. 1 of the drawings, the stalk of the plant is prevented from leaving the main loop. The locking device is then shifted into the position shown in Fig. 1 of the drawings, for the purpose above referred to.

The loops must, obviously, be of a size to permit of a limited movement of the plant, so the latter will not be injured, nor will its circulation be impaired, as often is the case where twine is made use of to secure the plant to the stake.

It is obvious that much time is saved by the use of the device, particularly by reason of the fact that the main loop thereof consists of two sections which are adapted to be conveniently and quickly brought to closing and opening positions. The device is inexpensive, is very economically constructed and durable in use. Although very light and formed entirely of wire, it constitutes an efficient support for a single plant or for a cluster of plants. It is capable of manufacture on a commercial scale, or in other words not so difficult to make as to be beyond the reasonable cost of such a contrivance.

The modification illustrated in Fig. 3 of the drawings differs from the one above described only in that an additional stake section is combined with the stake described in connection with Figs. 1 and 2 of the drawings. This additional stake section consists of a single strand of wire, denoted by the numeral 23, the said strand being provided with a plurality of spaced eyes 24, through which the main stake is extended. These eyes fit closely around the main stake and permit the additional stake section to be shifted on the main stake into any desired position, thereby extending the length of said main stake. The friction between the eyes and the main stake is sufficient to maintain the latter in any adjusted position. The additional stake section is driven into the ground, and, as the plant grows, the main stake and the loops thereon are raised, thereby properly supporting the plant and taking care of the growth thereof.

What I claim is:—

A plant support formed of a single piece of wire bent back upon itself at its middle point into parallel abutting relation to form a stake element, each of said parallel portions being at the top of the stake element bent outwards in opposite directions, then crossing one another and being, in a plane at right angles to said stake element, bent into semi-circular shape, the free ends of said semi-circular sections being in abutment, thereby forming a plant-engaging loop, the free ends of said semi-circular portions being adapted to recede from one another upon forcing said outwardly bent portions toward each other, a wire coil shiftable upon said stake element below the outwardly bent portions thereof, said wire coil when disposed immediately below said outwardly bent portions preventing accidental relative movement between the latter.

Signed at Norwalk, in the county of Fairfield and State of Connecticut this 29th day of September, A. D. 1927.

CARLO LAPOLLA.